United States Patent
Wu

(10) Patent No.: US 8,413,532 B2
(45) Date of Patent: Apr. 9, 2013

(54) SAFETY RELEASE MECHANISM FOR LINEAR ACTUATOR

(75) Inventor: Chou-Hsin Wu, Xindian (TW)

(73) Assignee: Timotion Technology Co. Ltd., New Taipei (TW)

( * ) Notice: Subject to any disclaimer, the term of this patent is extended or adjusted under 35 U.S.C. 154(b) by 510 days.

(21) Appl. No.: 12/815,669

(22) Filed: Jun. 15, 2010

(65) Prior Publication Data

US 2011/0304231 A1    Dec. 15, 2011

(51) Int. Cl.
*F16H 25/20* (2006.01)
*H02K 7/108* (2006.01)

(52) U.S. Cl. .................. 74/89.38; 74/89.39; 74/424.78; 74/606 R

(58) Field of Classification Search .................. 74/89.38, 74/89.39, 424.78, 606 R; 5/616; 192/48.6, 192/141; 188/72.1, 71.7–71.9, 72.7–72.9, 188/196 D, 196 V
See application file for complete search history.

(56) References Cited

U.S. PATENT DOCUMENTS

| | | | | |
|---|---|---|---|---|
| 1,562,831 | A * | 11/1925 | Hunt et al. | 74/89.38 |
| 3,479,890 | A * | 11/1969 | Howell | 74/89.36 |
| 5,673,593 | A * | 10/1997 | Lafferty | 74/89.38 |
| 7,856,901 | B2 * | 12/2010 | Lindemann et al. | 74/89.38 |
| 8,091,444 | B2 * | 1/2012 | Tseng | 74/89.39 |
| 8,302,227 | B2 * | 11/2012 | Jensen | 5/616 |
| 2007/0144279 | A1 * | 6/2007 | Wu et al. | 74/22 A |
| 2008/0210029 | A1 * | 9/2008 | Wang | 74/89.38 |
| 2010/0107790 | A1 * | 5/2010 | Yamaguchi | 74/89.38 |
| 2010/0162839 | A1 * | 7/2010 | Reif et al. | 74/89.38 |

FOREIGN PATENT DOCUMENTS

JP    2012-117673 A    * 6/2012

OTHER PUBLICATIONS

English Abstract of JP 2012-117673 A, Jun. 21, 2012.*

* cited by examiner

*Primary Examiner* — Vinh Luong
(74) *Attorney, Agent, or Firm* — Chun-Ming Shih; HDLS IPR Services

(57) ABSTRACT

A safety release mechanism for a linear actuator having a lead screw and a telescopic tube includes a nut, a protection shroud, a sleeve connected to the telescopic tube, a clutching element and a spiral spring. The nut is threadedly and drivingly connected to the lead screw. The protection shroud is fixedly and drivingly connected to one side of the nut. One end of the sleeve is sheathed on the protection shroud while the other end thereof is fixedly connected to the telescopic tube. The outer periphery of the sleeve is formed with notches. The clutching element is sheathed on the sleeve and formed with protrusions configured to be selectively inserted into or removed from the notches. The spiral spring is sheathed on the protection shroud and the clutching element. With this arrangement, cleavage or damage of components can be prevented to thereby increase the safety of operation.

16 Claims, 9 Drawing Sheets

SAFETY RELEASE MECHANISM FOR LINEAR ACTUATOR

FIELD OF THE INVENTION

The present invention generally relates to actuators, in particular to a linear actuator and its safety release mechanism applied in equipments such as medical instruments, electric chairs, etc.

BACKGROUND OF THE INVENTION

Linear actuator primarily uses an electric motor and a driving component such as a worm shaft and a worm wheel to drive and rotate a lead screw, while the lead screw is provided for driving a telescopic tube threadedly connected thereon to perform a linear extension or retraction with respect to an outer tube of the telescopic tube. Since the structure, installation and other conditions are simpler and more convenient than those of pneumatic and hydraulic cylinders, the linear actuator is used extensively for equipments such as hospital beds and electric chairs or any other areas requiring extensions and retractions.

For safety purpose, a linear actuator generally comes with limit switches installed in the outer tube and at positions corresponding to inner and outer limit positions of a moving path inside and outside the telescopic tube respectively, such that the limit switches are electrically coupled to the electric motor for controlling the ON/OFF of the electric motor and preventing any cleavage or damage to the transmission components caused by improper extension or retraction of telescopic tube. In addition, the limit switches can be installed at starting and ending positions of the path only, so that when the linear actuator is applied to equipments such as an electric chair, there is no safety measure provided at positions other than the starting and ending positions of the moving path, and children may be clamped or injured accidentally by the electric chair. Obviously, the conventional linear actuators require improvements.

SUMMARY OF THE INVENTION

Therefore, it is a primary objective of the present invention to provide a linear actuator and its safety release mechanism, such that when the telescopic tube is moved outwardly or retracted inwardly to a limit position, a nut can be released from the horizontal movement driven by a lead screw and can be rotated accordingly. The invention not only overcomes the issue of cleavage or damage of transmission components, but also improves the operation safety.

To achieve the aforementioned objective, the present invention provides a safety release mechanism for a linear actuator, and the linear actuator includes a lead screw and a telescopic tube, and the safety release mechanism comprises a nut, a protection shroud, a telescopic tube sleeve, a clutching element and a spiral spring, wherein the nut is threadedly and drivingly coupled to the lead screw; the protection shroud is fixedly coupled and linked to an edge of the nut; an end of the telescopic tube sleeve is sheathed on another end of the protection shroud and fixedly coupled to the telescopic tube, and the telescopic tube sleeve includes a plurality of notches formed at an outer periphery of the telescopic tube sleeve; the clutching element is sheathed onto the exterior of the telescopic tube sleeve and includes a plurality of protrusions formed thereon and inserted into or detached from the notches respectively; and the spiral spring is sheathed on the protection shroud and the clutching element. If the lead screw is rotated clockwise, then the spiral spring will drive the protection shroud in a tight binding manner, and the clutching element and the telescopic tube sleeve will be moved linearly together. If the lead screw is rotated counterclockwise and the telescopic tube is blocked, then the protection shroud will be released from being elastically clamped by the spiral spring and rotated together with the nut and the lead screw.

To achieve the aforementioned objective, the present invention provides a linear actuator, comprising a driving mechanism, a lead screw, an outer tube, a telescopic tube and a safety release mechanism, wherein the driving mechanism includes a holder and an electric motor mounted onto the holder for producing clockwise and counterclockwise rotations; the lead screw is driven by the electric motor to produce rotations; the outer tube is sheathed onto the exterior of the lead screw and fixed at an end of the holder, and a stop element is installed onto the outer tube and at a position away from an end of the holder; the telescopic tube is passed and coupled to the interior of the outer tube and capable of being extended, retracted or moved with respect to the outer tube; the safety release mechanism includes a nut threadedly and drivingly coupled to the lead screw, a protection shroud fixedly coupled to an edge of the nut and linked with the nut, a telescopic tube sleeve with an end sheathed on another end of the protection shroud and fixedly coupled to the telescopic tube, a clutching element sheathed on the exterior of the telescopic tube sleeve and installed corresponding to the stop element, and a spiral spring sheathed on the protection shroud and the clutching element, wherein the telescopic tube sleeve includes a plurality of notches formed at an outer periphery of the telescopic tube sleeve, and the clutching element includes a plurality of protrusions formed thereon and inserted into or detached from the notches respectively. If the lead screw is driven by the electric motor to rotate clockwise, the spiral spring will drive the protection shroud, the clutching element and the telescopic tube sleeve to move linearly together in a tight binding manner. When the clutching element is passed through the position of the stop element, the clutching element is pushed away and released from the link relation with the telescopic tube sleeve, such that the telescopic tube and the telescopic tube sleeve will stop moving outward.

In addition, the present invention also can omit the limit switches required by the conventional structure to simplify the structure and reduce the component cost significantly. In the path for the telescopic tube to move inwardly into the outer tube, the protection shroud will be released from the binding effect of the spiral spring if the telescopic tube has a resistance (caused by the opposite rotating directions of the protection shroud and the spiral spring) greater than the elastic clamping force (or friction damping) of the protection shroud tightly bounded by the spiral spring. Therefore, the invention can improve the user's safety greatly and prevent children from being clamped or injured accidentally by the linear actuator. The spiral spring of the present invention is formed by a plurality of continuously wound rings, and an interval is formed between any two adjacent rings, such that the spiral spring can be extended or contracted axially.

DESCRIPTION OF THE PREFERRED EMBODIMENTS

The technical characteristics and contents of the present invention will become apparent with the following detailed description accompanied with related drawings, but the drawings are provided for reference and illustration of the invention only, but not intended for limiting the scope of the invention.

Figure 1:
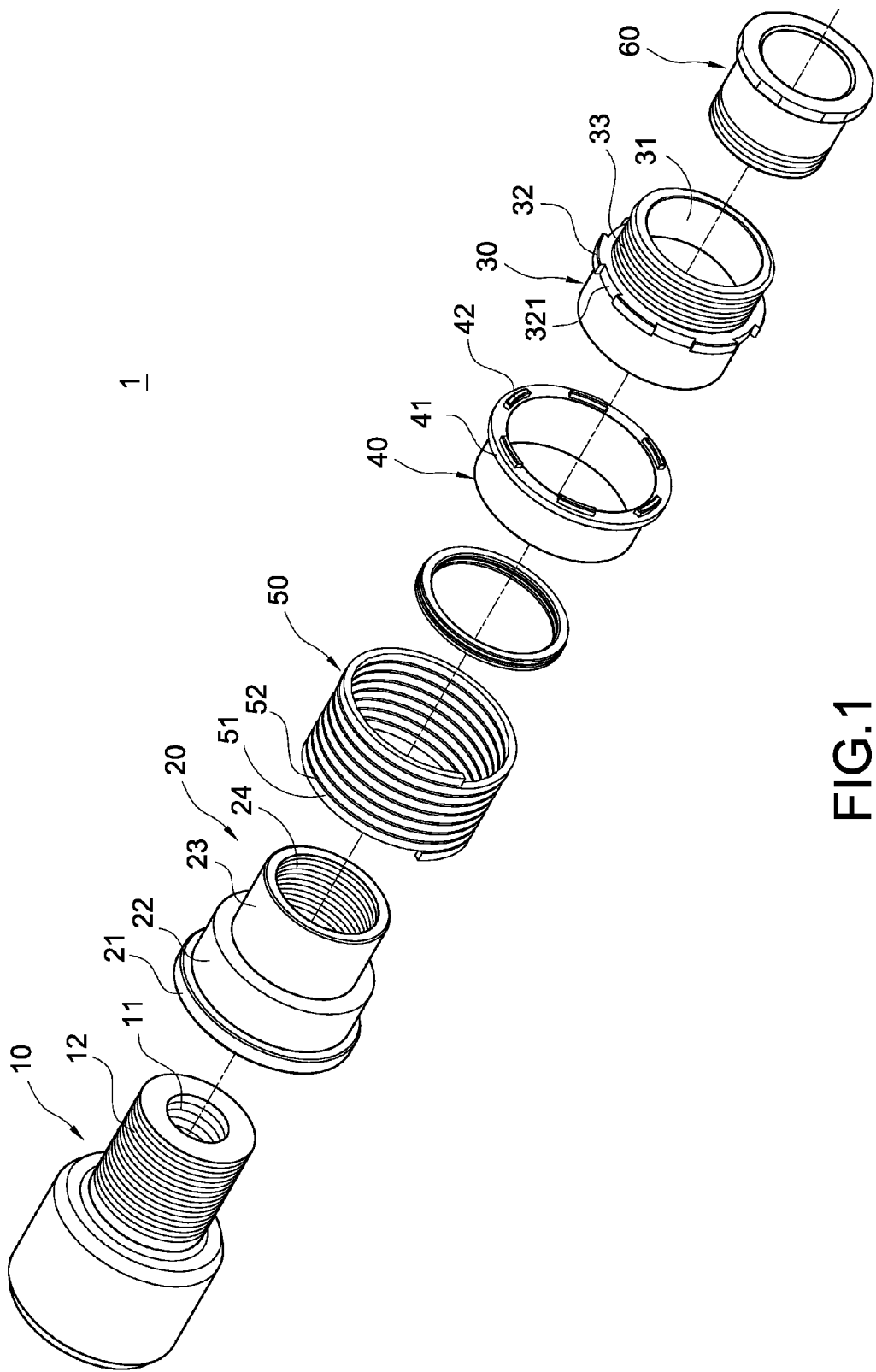
FIG. 1 is an exploded view of a safety release mechanism in accordance with present invention.
Figure 2:
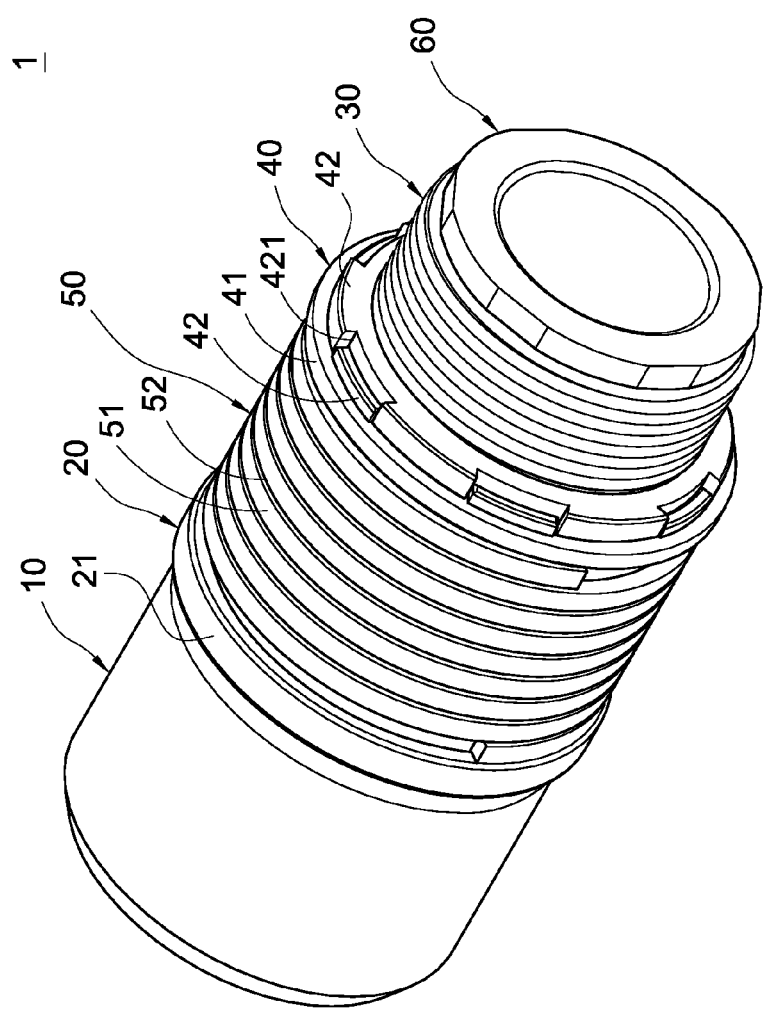
FIG. 2 is a perspective view of a safety release mechanism in accordance with present invention.
Figure 3:
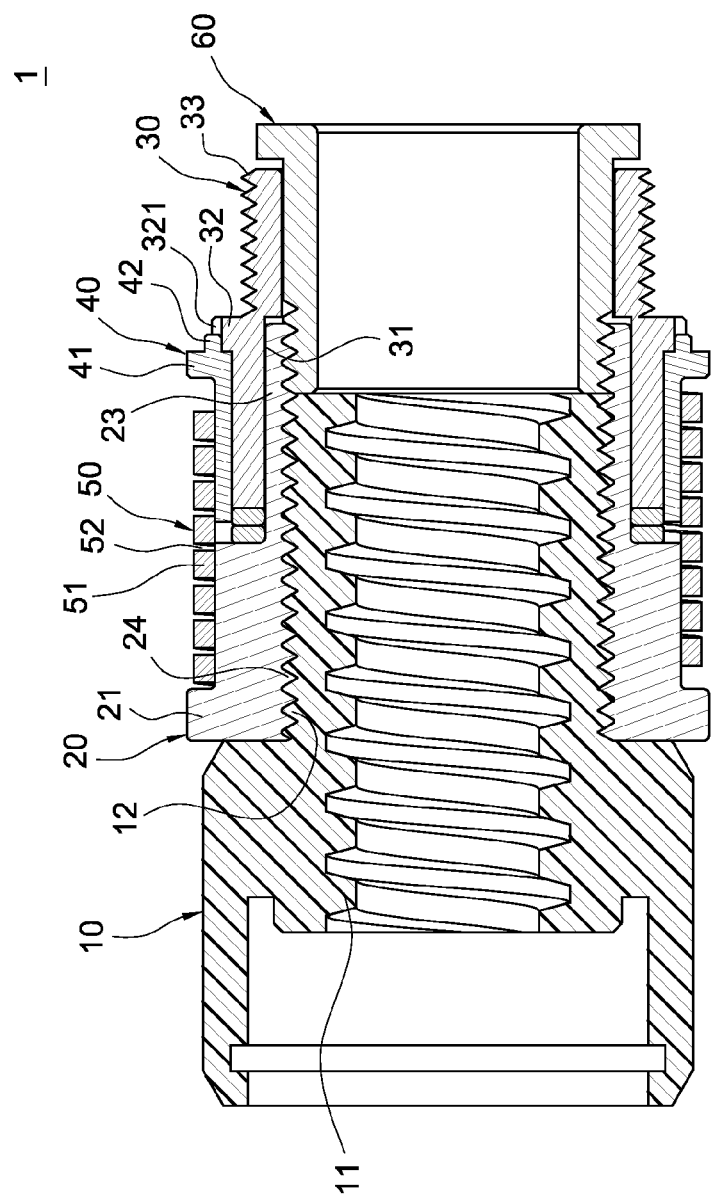
FIG. 3 is a cross-sectional view of a safety release mechanism in accordance with present invention.

With reference to FIGS. 1 to 3, the present invention provides a linear actuator and its safety release mechanism, and the safety release mechanism 1 comprises a nut 10, a protection shroud 20, a telescopic tube sleeve 30, a clutching element 40 and a spiral spring 50.

The nut 10 is made of a plastic material (such as POM) and comprised of a large-diameter cylinder and a small-diameter cylinder extended from an end of the large-diameter cylinder, and the nut 10 is substantially T-shaped, and a first internal thread 11 is formed at the middle section of the nut 10, and a first external thread 12 is formed on an external surface of the small-diameter cylinder.

The protection shroud 20 is a stair-stepping cylinder, comprising a retaining wall 21, a first cylindrical section 22 extended outwardly from an end of the retaining wall 21, and a second cylindrical section 23 extended outwardly from an end of the first cylindrical section 22, wherein the protection shroud 20 includes a second internal thread 24 formed at a middle section of the protection shroud 20 and threadedly coupled to the first external thread 12.

The telescopic tube sleeve 30 includes a central hole 31 (as shown in FIG. 3) formed at the outer periphery of the second cylindrical section 23, wherein a convex ring 32 is formed and extended from an external surface at the middle of the telescopic tube sleeve 30, and a plurality of notches 321 are formed at the interval between the convex ring 32 of the telescopic tube sleeve 30; and a second external thread 33 is formed at an edge of the convex ring 32.

The clutching element 40 is also a circular cylinder sheathed on the exterior of the telescopic tube sleeve 30, and a retaining ring 41 is extended outwardly from an end of the clutching element 40, and a plurality of protrusions 42 are extended from an external end surface of the retaining ring 41 and inserted into or detached from the notches 321 respectively.

The spiral spring 50 of this preferred embodiment is a right-hand spiral spring formed by a plurality of continuously wound rings 51, and one or more intervals 52 are formed between the rings 51, wherein the interval 52 can be formed continuously or formed partially, such that the spiral spring 50 can be extended or contracted axially. The spiral spring 50 is coupled to external surfaces of the first cylindrical section 22 of the protection shroud 20 and the clutching element 40 in a circular sheathing manner, and both ends of the spiral spring 50 are abutted between the retaining wall 21 and the retaining ring 41 respectively, such that the elasticity of the spiral spring 50 is provided for pushing the clutching element 40 to move axially in a direction towards the telescopic tube sleeve 30.

In addition, the safety release mechanism 1 of the present invention further comprises a limit position cover 60 passed into the telescopic tube sleeve 30 and threadedly coupled to the second internal thread 24 of the protection shroud 20 for limiting the axial displacement of the telescopic tube sleeve 30.

Figure 4:
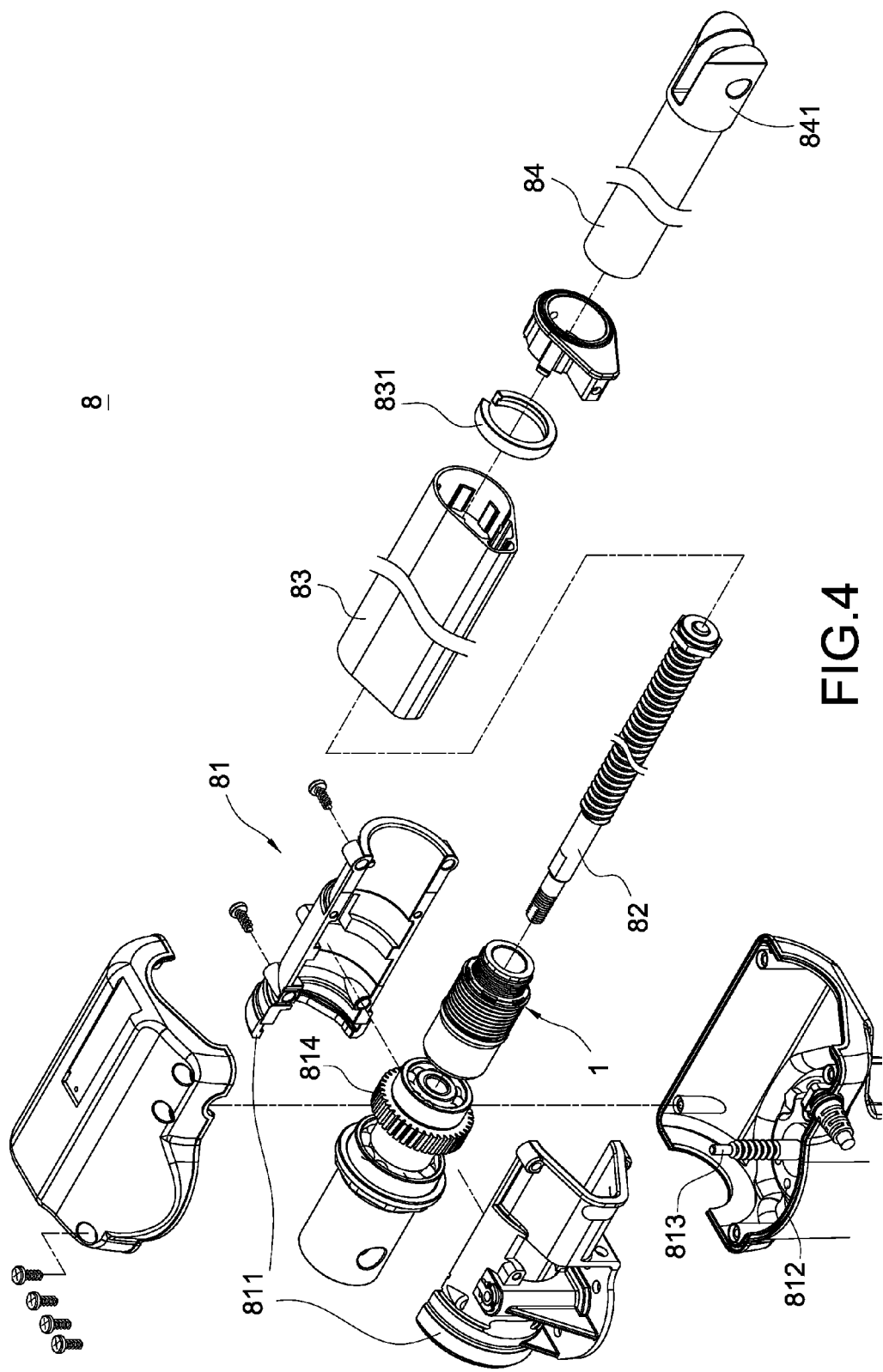
FIG. 4 is an exploded view of a linear actuator in accordance with present invention.
Figure 5:
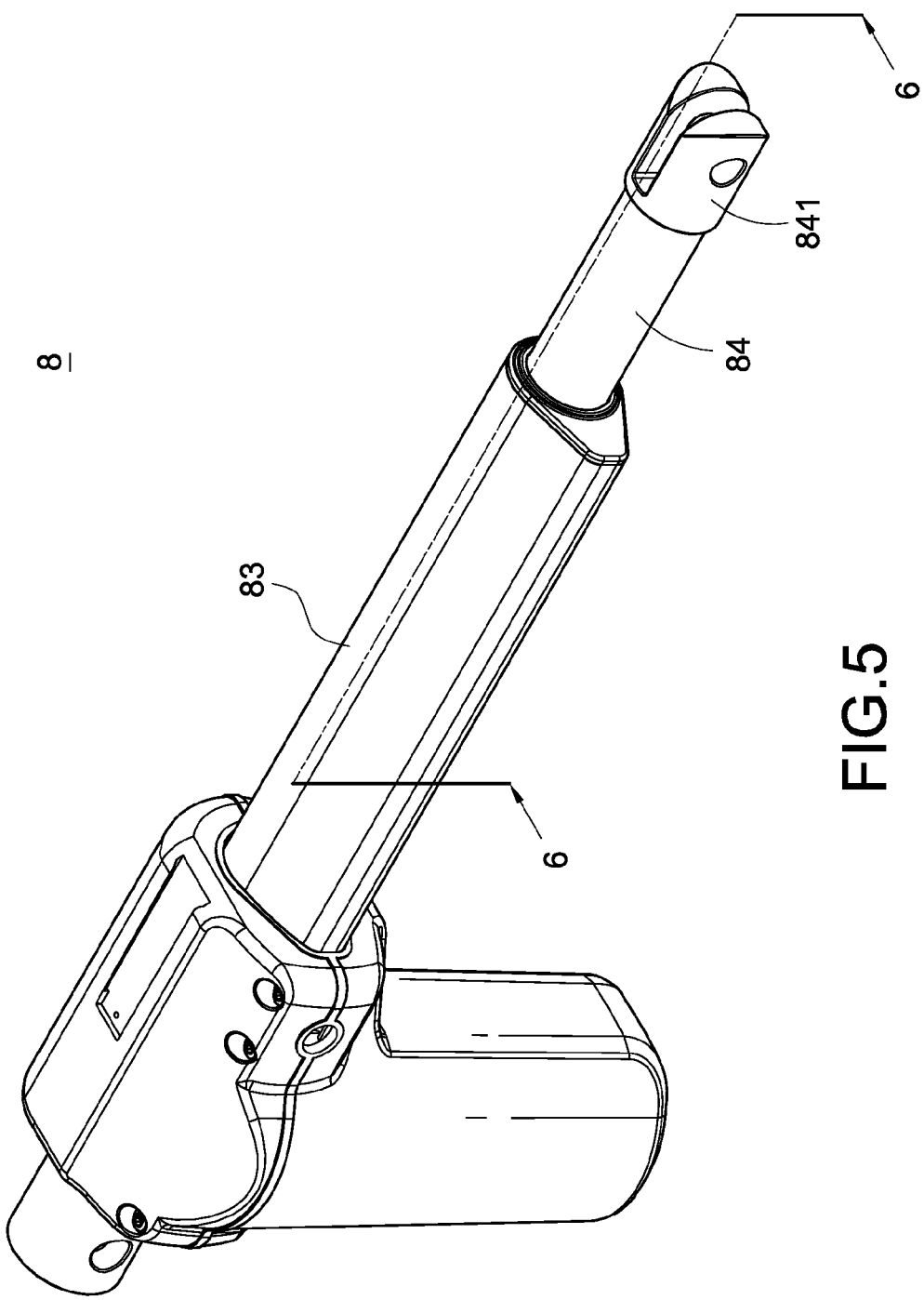
FIG. 5 is a cross-sectional view of a linear actuator in accordance with present invention.

With reference to FIGS. 4 and 5, the present invention provides a linear actuator 8 comprising a driving mechanism 81, a lead screw 82, an outer tube 83, a telescopic tube 84 and the safety release mechanism 1.

The driving mechanism 81 includes a holder 811, an electric motor 812 mounted to the holder 811 for producing a clockwise rotation, a worm shaft 813 extended outwardly from the center of the electric motor 812, and a worm wheel 814 contained in the holder 811 and drivingly engaged with the worm shaft 813.

An end of the lead screw 82 is passed into the safety release mechanism 1 and fixedly coupled to the worm wheel 814, and another end of the lead screw 82 is extended in a direction away from the holder 811. The lead screw 82 drives the worm shaft 813 by the electric motor 812 and also drives the worm wheel 814 to produce rotations. The external thread of the lead screw 82 is threadedly and drivingly coupled to the first internal thread 11 of the nut 10 (as shown in FIG. 3). In addition, the external thread of the lead screw 82 has the same rotating direction as the spiral spring 50.

The outer tube 83 is sheathed on the exterior of the lead screw 82 and fixed at an end of the holder 811, and a stop element 831 is installed inside a space of the outer tube 83 and at a position away from an end of the holder 811, wherein the stop element 831 of this preferred embodiment is a C-shaped retaining ring, and the stop element 831 is installed corresponding to the clutching element 40.

The telescopic tube 84 includes an internal thread formed at an end of the telescopic tube 84 and threadedly coupled to the second external thread 33, and the telescopic tube 84 is passed and coupled to the interior of the outer tube 83 and can be extended or contracted axially with respect to the outer tube 83. The stop element 831 is generally installed at a maximum limit position of a moving path of moving the telescopic tube 84 outward. In addition, a support 841 is threadedly coupled to an end of the telescopic tube 84 away from the telescopic tube sleeve 30 and generally sheathed on a shaft (not shown in the figure) and thus the support 841 cannot produce rotations.

Figure 6:
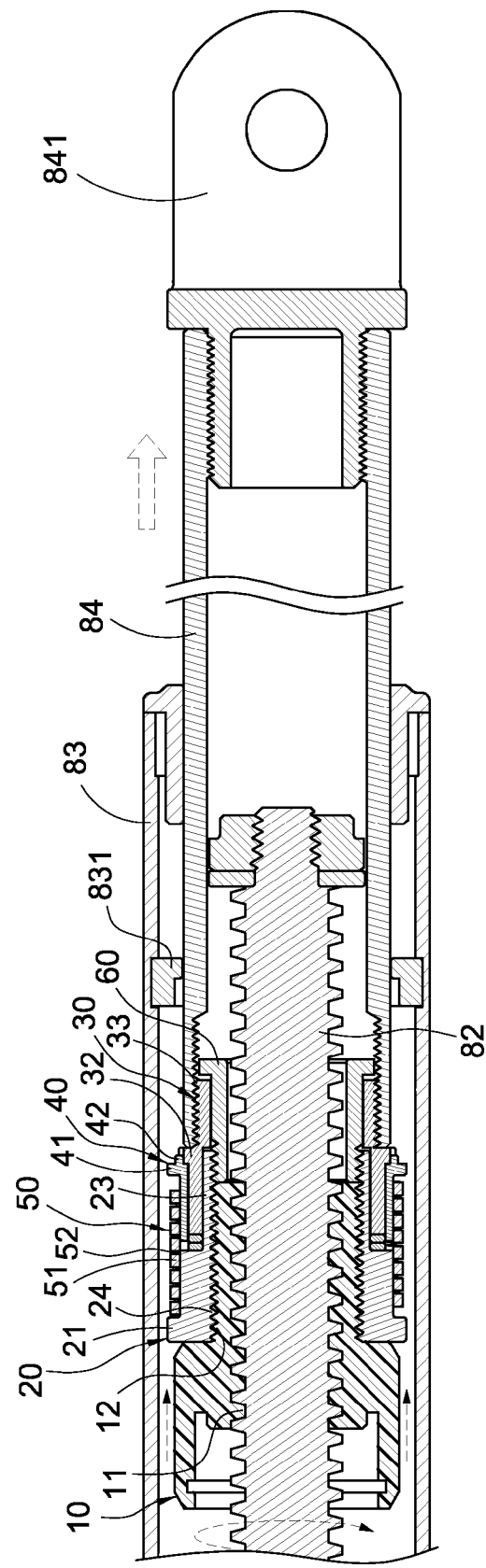
FIG. 6 is a cross-sectional view of a telescopic tube of a linear actuator moved outwardly in an application of the present invention.
Figure 7:
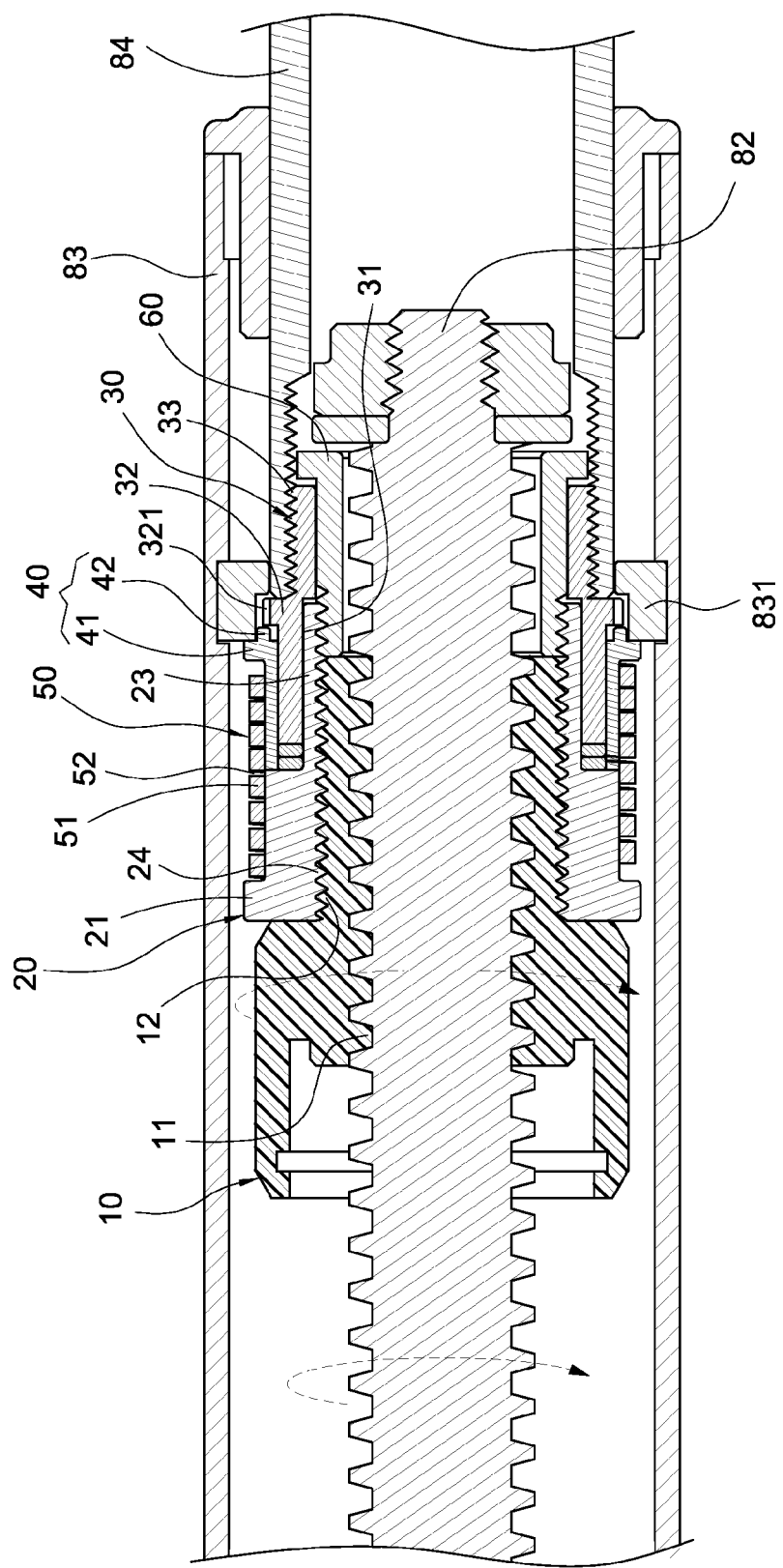
FIG. 7 is another cross-sectional view of a telescopic tube of a linear actuator moved outwardly in an application of the present invention.

With reference to FIGS. 6 and 7, the electric motor 812 is provided for driving and rotating the worm shaft 813, such that the worm wheel 814 and the lead screw 82 can be rotated synchronously. If the lead screw 82 is rotated clockwise, the support 841 on the right side of the telescopic tube 84 will be moved axially outward by the safety release mechanism 1 and the telescopic tube 84 which are rotated by the lead screw 82, under the condition that the support 841 is not rotated. Now, the protection shroud 20 and the clutching element 40 are sheathed and linked by the radial contraction of the spiral spring 50. When the safety release mechanism 1 and the telescopic tube 84 is moved continuously outward to a position approaching the limit position (as shown in FIG. 7), the retaining ring 41 of the clutching element 40 will be pushed away from the telescopic tube sleeve 30 by the stop element 831, so that each protrusion 42 is separated from each notch 321. Under the condition of the lead screw 82 being rotated continuously, the nut 10, the protection shroud 20, the clutching element 40 and the spiral spring 50 will be rotated together with the lead screw 82 in the same direction, and the telescopic tube sleeve 30 and the telescopic tube 84 will be released from the link relation with the clutching element 40, and thus they will stop moving (or will not move outwardly anymore).

Figure 8:
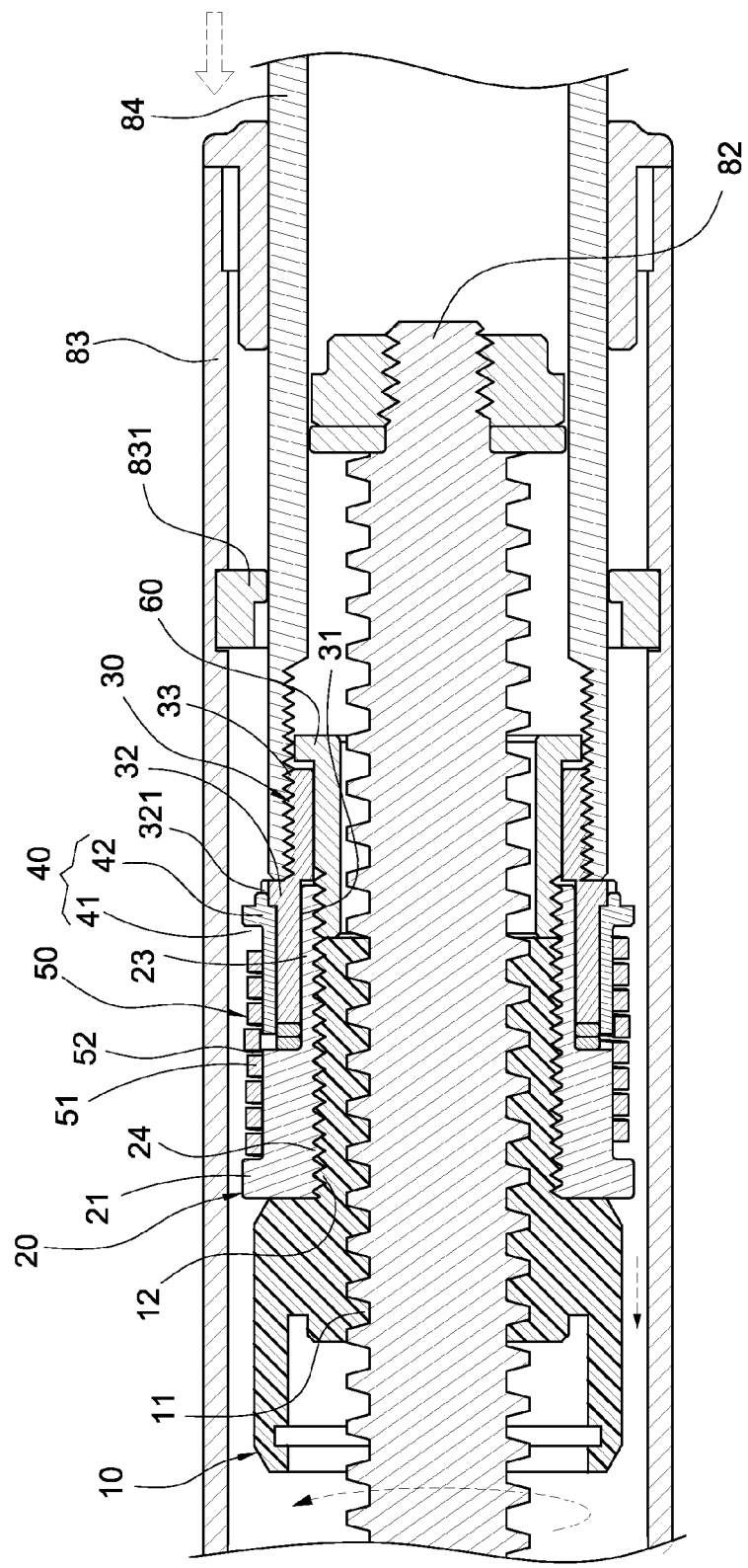
FIG. 8 is a cross-sectional view of a telescopic tube of a linear actuator retracted inwardly in an application of the present invention.
Figure 9:
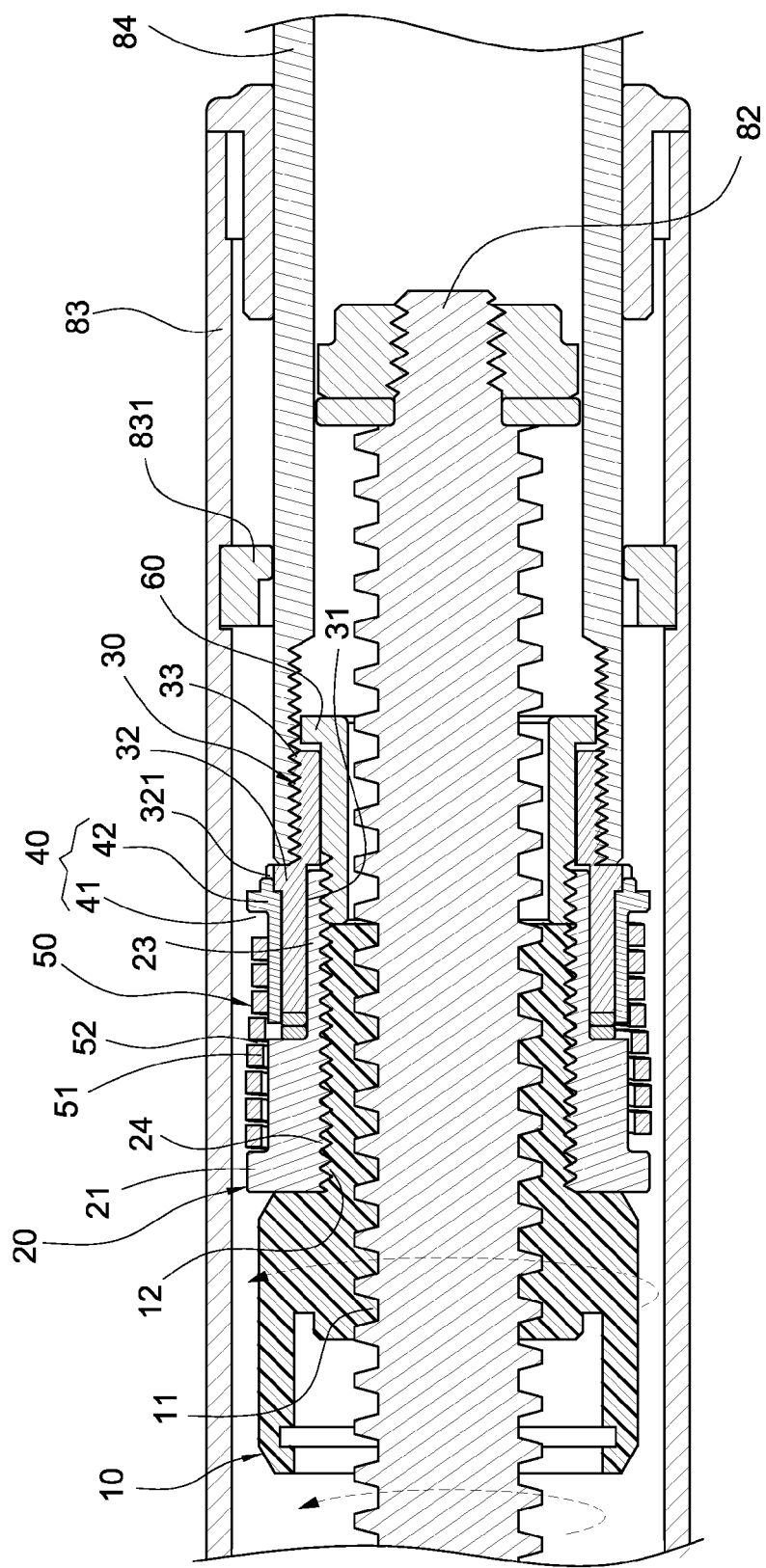
FIG. 9 is another cross-sectional view of a telescopic tube of a linear actuator retracted inwardly in an application of the present invention.

With reference to FIGS. 8 and 9, when the lead screw 82 is rotated in a negative direction (counterclockwise), the safety release mechanism 1 and the telescopic tube 84 will be rotated by the lead screw 82 to perform an axial retraction together. If a larger resistance is encountered in the path of retracting the telescopic tube 84, the rotating directions of the nut 10 and the protection shroud 20 will be affected by the lead screw 82. If the protection shroud 20 is rotating in a direction opposite to the spiral spring 50, then a section of the spiral spring 50 being clamped to the external surface of the protection shroud 20 will be expanded outwardly (as shown in FIG. 9), such that the nut 10 and the protection shroud 20 will be rotated in the same direction as the lead screw 82 (which will produce an idle rotation). Now, the telescopic tube 84 will stop retracting inwardly. When the telescopic tube 84 is retracted to an end of the path, an object (not shown in the figure) coupled to the support 841 has been abutted or stacked already, so that the retraction of the telescopic tube 84 will receive a larger resistance. Similarly, the telescopic tube 84 will stop retracting inwardly.

In summation of the description above, the linear actuator and its safety release mechanism of the present invention achieve the expected effects and overcome the shortcomings of the prior art, and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A safety release mechanism for a linear actuator, and the linear actuator having a lead screw and a telescopic tube, and the safety release mechanism comprising:
    a nut, threadedly and drivingly coupled to the lead screw;
    a protection shroud, fixedly and drivingly coupled to an edge of the nut;
    a telescopic tube sleeve, with an end sheathed on the protection shroud and another end fixed to the telescopic tube, and having a plurality of notches formed at an outer periphery of the telescopic tube sleeve;
    a clutching element, sheathed on the telescopic tube sleeve, and having a plurality of protrusions formed on the clutching element, and selectively inserted into or detached from the notches; and
    a spiral spring, sheathed on the protection shroud and the clutching element;
    thereby, when the lead screw is rotated clockwise, then the spiral spring drives the protection shroud in a tight binding manner, and the clutching element and the telescopic tube sleeve is moved linearly together, and when the lead screw is rotated counterclockwise and the telescopic tube is blocked, then the protection shroud is released from being elastically clamped by the spiral spring, and the protection shroud is rotated together with the lead screw.

2. The safety release mechanism for the linear actuator as recited in claim 1, wherein the nut includes a first external thread formed at an outer periphery of an end of the nut, and the protection shroud includes a second internal thread formed at a middle section of the protection shroud and threadedly coupled to the first external thread.

3. The safety release mechanism for the linear actuator as recited in claim 1, wherein the protection shroud includes a retaining wall, a first cylindrical section outwardly extended from an end of the retaining wall, and a second cylindrical section extended outwardly from an end of the first cylindrical section, and the telescopic tube sleeve is sheathed on an outer periphery of the second cylindrical section, and an end of the spiral spring away from the clutching element is sheathed on an outer periphery of the first cylindrical section.

4. The safety release mechanism for the linear actuator as recited in claim 3, wherein the telescopic tube sleeve includes a convex ring formed and extended from an external surface of the convex ring, and the notches are formed in the intervals between the convex rings, and a retaining ring is outwardly extended from an end of the clutching element, and the protrusions are extended from an external end surface of the retaining ring and inserted into or detached from the notches respectively.

5. The safety release mechanism for the linear actuator as recited in claim 4, wherein the spiral spring includes both ends abutted against the retaining wall of the protection shroud and the retaining ring of the clutching element respectively.

6. The safety release mechanism for the linear actuator as recited in claim 1, wherein the spiral spring rotates in the same direction of the lead screw.

7. The safety release mechanism for the linear actuator as recited in claim 6, wherein the spiral spring includes at least one interval formed between the plurality of continuously wound rings.

8. The safety release mechanism for the linear actuator as recited in claim 1, further comprising a limit position cover passed into the telescopic tube sleeve and fixedly coupled to the protection shroud for limiting an axial displacement of the telescopic tube sleeve.

9. A linear actuator, comprising:
    a driving mechanism including a holder and an electric motor mounted to the holder for producing clockwise and counterclockwise rotations;
    a lead screw, driven by the electric motor for producing a rotation;
    an outer tube, sheathed on the exterior of the lead screw, and fixed to an end of the holder, and having a stop element installed on the outer tube and at an end away from the holder;
    a telescopic tube, passed and coupled into the outer tube, and capable of extending or retracting with respect to the outer tube; and
    a safety release mechanism, comprising a nut threadedly and drivingly coupled to the lead screw; a protection shroud, fixedly and drivingly coupled to an edge of the nut; a telescopic tube sleeve, with an end sheathed on the protection shroud and another end fixed to the telescopic tube; a clutching element, sheathed on the telescopic tube sleeve, and installed corresponding to the stop element; a spiral spring sheathed on the protection shroud and the clutching element, and having a plurality of notches formed at an outer periphery of the telescopic tube sleeve, and the clutching element having a plurality of protrusions formed thereon and inserted into or detached from the notches respectively;

thereby, when the lead screw is rotated clockwise, then the spiral spring drives the protection shroud in a binding manner to drive the protection shroud, the clutching element and the telescopic tube sleeve to move linearly together, and when the clutching element is passed through a position of the stop element and blocked, the clutching element is pushed away to release the link relation with the telescopic tube sleeve, such that the telescopic tube and the telescopic tube sleeve stop moving outward.

10. The linear actuator of claim 9, wherein the nut includes a first external thread formed at an outer periphery of an end of the nut, and the protection shroud includes a second internal thread formed at a middle portion of the protection shroud and threadedly coupled to the first external thread.

11. The linear actuator of claim 9, wherein the protection shroud a retaining wall, a first cylindrical section outwardly extended from an end of the retaining wall, and a second cylindrical section outwardly extended from an end of the first cylindrical section, and the telescopic tube sleeve is sheathed on an outer periphery of the second cylindrical section, and an end of the spiral spring away from the clutching element is sheathed on an outer periphery of the first cylindrical section.

12. The linear actuator of claim 11, wherein the telescopic tube sleeve includes a convex ring formed and extended from an external surface of the convex ring, and the notches are formed in the interval between the convex rings, and a retaining ring is outwardly extended from an end of the clutching element, and the protrusions are extended from an external distal surface of the retaining ring and inserted into or detached from the notches respectively.

13. The linear actuator of claim 12, wherein the spiral spring has both ends abutted against the retaining wall of the protection shroud and the retaining ring of the clutching element respectively.

14. The linear actuator of claim 9, wherein the spiral spring rotates in the same direction of the lead screw.

15. The linear actuator of claim 14, wherein the spiral spring includes at least one interval formed between the plurality of continuously wound rings.

16. The linear actuator of claim 9, wherein the safety release mechanism further comprises a limit position cover passed into the telescopic tube sleeve and fixedly coupled to the protection shroud for limiting an axial displacement of the telescopic tube sleeve.

* * * * *